US012789414B2

(12) United States Patent
Ragiel

(10) Patent No.: US 12,789,414 B2
(45) Date of Patent: Nov. 10, 2026

(54) BONDED INSULATION PRODUCT BATT FROM SPENT CARPET AND WASTE

(71) Applicant: Michael Sean Ragiel, Bedminster, NJ (US)

(72) Inventor: Michael Sean Ragiel, Bedminster, NJ (US)

( * ) Notice: Subject to any disclaimer, the term of this patent is extended or adjusted under 35 U.S.C. 154(b) by 405 days.

(21) Appl. No.: 18/406,436

(22) Filed: Jan. 8, 2024

(65) Prior Publication Data

US 2024/0142041 A1 May 2, 2024

Related U.S. Application Data

(62) Division of application No. 15/282,168, filed on Sep. 30, 2016, now abandoned.

(51) Int. Cl.

| | |
|---|---|
| ***B29B 17/00*** | (2006.01) |
| ***B29B 17/04*** | (2006.01) |
| ***D04H 1/4274*** | (2012.01) |
| ***D04H 1/4382*** | (2012.01) |
| ***D04H 1/541*** | (2012.01) |

(Continued)

(52) U.S. Cl.

CPC .......... *B29B 17/0042* (2013.01); *B29B 17/04* (2013.01); *D04H 1/4274* (2013.01); *D04H 1/43828* (2020.05); *D04H 1/43835* (2020.05); *D04H 1/5412* (2020.05); *D04H 1/5418* (2020.05); *D04H 1/55* (2013.01); *D04H 1/558* (2013.01); *D04H 1/64* (2013.01); *F16L 59/028* (2013.01); *F16L 59/06* (2013.01); *B29B 2017/044* (2013.01);

(Continued)

(58) Field of Classification Search

CPC ........................ B29B 17/0042; D04H 1/43825

See application file for complete search history.

(56) References Cited

U.S. PATENT DOCUMENTS 1,906,028 A * 4/1933 Weber ...................... B68G 7/02 5/655.7

3,216,464 A * 11/1965 Horst ..................... H01Q 17/00 198/525

(Continued)

*Primary Examiner* — Timothy Kennedy

(74) *Attorney, Agent, or Firm* — Ernest D. Buff & Associates, LLC; Ernest D. Buff

(57) ABSTRACT

A thermal insulation batt is created from recycled carpet fibers and fire resistant cotton shoddy bonded by staples of bi-component fiber having a polyester core and low melting polymeric sheath. The low melting polymeric sheath melts at a temperature well below the melting or degradation temperature of any of the carpet fibers from the recycled carpets. Since the sheath has a small thickness, the amount of melt created is small and bonding occurs only between the bi-component staple fiber and adjacent carpet fiber or fire resistant cotton shoddy without melt overflow. The rigidized thermal insulation batt can be used in a building between studs and may be used in an automobile door for sound proofing. This product is particularly well suited for use as (Continued)

acoustic and thermal insulation in buildings as "non-load bearing" partitions in interior offices of commercial buildings. This bonded low density composite fibrous structure has fire retarding constituents incorporated within the batt to retard propagation of building fire. These stated uses are non-limiting; and other uses are contemplated, including automobile interior structures.

7 Claims, 3 Drawing Sheets

(51) Int. Cl.

| | |
|---|---|
| ***D04H 1/55*** | (2012.01) |
| ***D04H 1/558*** | (2012.01) |
| ***D04H 1/64*** | (2012.01) |
| ***F16L 59/02*** | (2006.01) |
| ***F16L 59/06*** | (2006.01) |
| *B29L 31/00* | (2006.01) |

(52) U.S. Cl.
CPC ................. *B29B 2017/0488* (2013.01); *B29L 2031/7322* (2013.01); *Y02W 30/52* (2015.05)

(56) References Cited

U.S. PATENT DOCUMENTS

| | | | | |
|---|---|---|---|---|
| 3,726,954 | A * | 4/1973 | Munk ................... | B30B 15/302<br>141/286 |
| 4,545,166 | A * | 10/1985 | Kielmeyer ............. | E04B 9/205<br>52/506.06 |
| 4,915,897 | A * | 4/1990 | Farrington ........ | A61F 13/15642<br>425/81.1 |
| 5,017,312 | A * | 5/1991 | Peters ...................... | D04H 1/74<br>264/108 |
| 5,169,580 | A * | 12/1992 | Marcus .................... | B68G 1/00<br>264/126 |
| 2007/0060005 | A1* | 3/2007 | Yang ........................ | D04H 1/02<br>264/109 |
| 2011/0247839 | A1* | 10/2011 | Lalouch ............... | D04H 1/4209<br>264/109 |
| 2011/0305878 | A1* | 12/2011 | Gladfelter ................ | D21D 1/32<br>156/62.4 |
| 2012/0161368 | A1* | 6/2012 | Levy ....................... | B29B 17/02<br>264/141 |
| 2013/0101805 | A1* | 4/2013 | Altshuler .................. | B32B 3/30<br>264/109 |

* cited by examiner

BONDED INSULATION PRODUCT BATT FROM SPENT CARPET AND WASTE

CROSS-REFERENCE TO RELATED APPLICATIONS

This application is a divisional of applicant's co-pending U.S. patent application Ser. No. 15/282,168 filed Sep. 30, 2016 entitled "Bonded Insulation Product Batt From Spent Carpet And Waste", the disclosure of which is hereby incorporated in its entirety by reference thereto.

1. FIELD OF THE INVENTION

The present invention relates fire retardant thermal and acoustic insulation materials; and, more particularly, to a bonded fire retardant insulation batt product produced from spent carpet waste.

2. DESCRIPTION OF THE PRIOR ART

A number of prior art patents relate to extracting carpet fibers from spent carpets. Since carpets are made from variety of materials including cotton, wool, polyester, nylon, olefins and others, their extraction methods may need to be different to maintain the integrity of the fibers.

U.S. Pat. No. 4,189,338 to Ejima et al. discloses a method for forming autogenously bonded non-woven fabric comprising bi-component fibers. A porous non-woven fabric having good dimensional stability and uniformity is prepared from a web obtained by arranging side-by-side composite fibers alone or blending them with another fibrous material into a web and heat-treating the resulting web at a specified temperature. These composite fibers have few naturally developed crimps. They are obtained by stretching unstretched side-by-side composite fibers consisting of a polypropylene component and an olefin polymer component having a specified melting point and a specified melt flow rate. The '338 patent teaches away from using a bi-component fiber without the flow rate. Specifically, the '338 patent states: "in case of sheath and core type composite fibers, latent crimpability is reduced and in this sense the above-mentioned defect of side-by-side type composite fibers may be alleviated. But when the sheath part thereof is composed of a lower melting point component, the bulkiness and elasticity of the resultant non-woven fabrics are reduced because adhesion of the two components in the non-woven fabric is effected entirely along the contacting part thereof". The resultant product of the '338 patent does not contain a bi-component polyester fiber and does not produce a bond between fibers forming a low density insulative bonded composite.

U.S. Pat. No. 4,732,809 to Harris. Jr. et al. discloses bicomponent fibers and nonwovens made therefrom. This novel heat bondable bicomponent fiber is useful in the production of nonwoven fabrics, as well as methods for the production of such fibers. The fibers comprise a latently adhesive component for forming interfilamentary bonds upon the application of heat and subsequent cooling. Application of sufficient heat melts the latently adhesive component. Upon subsequent cooling, a substantial shrinkage force appears in said other component. This shrinkage force appears only after resolidification of said latently adhesive component. The fiber core component is polyester while the adhesive component, in the form of a sheath, is polyethylene or polypropylene, which forms interfilamentary bonds at a temperature in the range of from about 90° C. to about 120° C. Polyethylene has a melting point of 239-275° F. or 115-135° C. depending upon the molecular weight of polyethylene. Polypropylene has a melting point 266° F. or 130° C. As shown in Example 2, 4 mats were formed and compressed at 2000 psi and then heat treated at 145° C. or 293° F. to create a bond. The bonding is not conducted without compression and will not form a thermally insulating batt.

U.S. Pat. No. 5,057,168 to Muncrief discloses method of making low density insulation composition. This method and apparatus is for producing a low density thermal insulation batt. The batt includes binder fibers, which have been softened to adhere to and interconnect insulative fibers in the batt. The batt also includes short stilt fibers which interconnect and space apart the insulative fibers to define interstitial air pockets intermediate the insulative fibers. The bonding temperature at which the binder fibers soften and adhere to the insulative fibers is greater than 130° F., greater than the blending temperature, and less than the melting temperature of the insulative fibers. The low density insulation may include fire retardation compositions including borates, aluminum hydrate, halogenated hydrocarbons, and decabromo diphensyl dether. The insulative fibers are cotton and binder fibers composed of E. I. du Pont Dacron D-262 polyester with a melting point of melting point of 142° C. (288*F) The insulative fiber is not indicated to be derived from carpet fibers recycled from spent carpets.

U.S. Pat. No. 5,162,153 to Cooke, et al. discloses poly (butylene terephthalate) copolyester and a process for preparing it Poly(butylene terephthalate) copolyester advantageous of use as sheath materials in bicomponent fibers are prepared by a process for preparing a high-molecular weight, linear copolyester by condensing 40-85 molar percent of terephthalic acid. In producing the bicomponent fibers having PET as the core around which the PBT copolymer is extruded as a sheath, one should bear in mind that typical commercial PET melts at about 250° C. unless modified with an ingredient which lowers the softening point. The melting point of highly crystalline PET is about 270° C. The softening/melting point of PBT usually depends on its degree of crystallization and can range from a pressure deflection temperature at about 162° C. to above about 225° C. Thus, the core of the fiber will solidify at a higher temperature than the grafted linear polymer or a blend, which contains the linear polymer. The PBT sheath melting point is too high for bond formation at 350-375° F.

U.S. Pat. No. 5,518,188 to Sharer discloses a method for recycling carpet forming components from waste carpet. This system separates and packages carpet forming fibrous material and backing material from carpet pieces for recycling. The system comprises a shredding apparatus for separating carpet pieces into substantially even sized small pieces of between two inches by two inches and four inches by four inches. These pieces are passed to a granulating apparatus which slices them into smaller pieces of between one-quarter inch and one-half inch, which causes the fibrous material and backing material to begin to separate. A surge apparatus receives the partially separated materials and delivers them in an even manner to an elutriator. The elutriator using an upper air delivery system for carrying off the fibrous material and a lower air delivery system for carrying off the backing material delivers the separated materials to storage apparatus, which readies the separated materials for recycling. The recycled components of the spent carpet are not indicted to produce a bonded insulation batt.

U.S. Pat. No. 5,535,945 to Sferrazza et al. discloses a carpet recycling process and system. This process and system reclaims polymeric fibers (e.g., nylon) from post-consumer carpeting. Post-consumer carpeting is shredded into strips, which are dismantled to form a mixture of the fibers to be reclaimed when the backing material is discarded. A substantial portion of the fibers is separated from the backing material. The carpet strips are dismantled by impacting the strips of carpeting against an anvil structure with hammer elements. A secondary reclamation system is provided whereby the separated backing material, which may contain some fibers bound thereto is subjected to secondary dismantling and separation operations. The fractions obtained from the primary and secondary separation operations containing predominantly the polymeric fibers may thus be combined so as to form a process discharge stream, which can be pelletized and/or baled as desired. The carpet recycling process and system outputs nylon pellets and other products, and the recycled spent nylon carpet is not indicted to produce a bonded insulation batt.

U.S. Pat. No. 5,597,427 to Herzberg discloses a method for making multilayer nonwoven thermal insulating batts. The batt comprises a blend of bonding staple fibers and staple fill fibers, the fibers being formed into a multilayer batt. The bonding fibers are subsequently bonded sparingly to staple fill fibers at the points of contact to enhance the structural stability of the multilayer batt but allow delamination of the individual web layers under mechanical action. Also provided is a method of making a thermal insulating nonwoven multilayer batt comprising the steps of: (a) forming a web of bonding staple fibers and staple fill fibers such that the web has a substantially smooth side and a loose fibrous side; (b) forming a batt of multiple layers of the webs; (c) subjecting the layered batt to sufficient heat to cause bonding of the bonding staple fibers to other bonding staple fibers and staple fill fibers at points of contact within each layer and sufficient bonding between each layer to stabilize the batt yet permit delamination of the layers when the batt is subjected to mechanical action. Since the batt delaminates when subject to mechanical action, it is not an integral batt and cannot be reliably used for insulation in buildings U.S. Pat. No. 5,719,198 to Young et al. discloses recycling of carpet scrap. A substantially homogeneous thermoplastic blend is formed by granulating carpet scrap of polymeric face fibers and polymeric backing to obtain an incompatible heterogeneous mixture of polyamide and polyesters in combination with polyolefins. A compatibilizing agent is added to the heterogonous mixture for compatibilization of polymeric fibers and said polymeric backing. The compatibilizing agent is a mixture of: a maleic anhydride modified poly(ethylene-co-vinyl acetate); and a poly(ethylene-co-vinyl acetate) resin modifier, containing between about 9% and 36% vinyl acetate; and heating the granulated scrap in admixture with said compatibilizing agent to form a substantially homogeneous thermoplastic blend. This homogeneous thermoplastic blend is not a bonded insulation batt.

U.S. Pat. No. 6,132,868 to Dean et al. discloses copolyester binder fibers. The fibers, particularly binder fibers, are made from copolyesters and the copolyesters themselves. The copolyesters are generally formed from 1,3- or 1,4-cyclohexanedimethanol, ethylene glycol and isophthalic acid or esters thereof and at least one dicarboxylic acid selected from terephthalic acid, naphthalene dicarboxylic acid, 1,3- or 1,4-cyclohexanedicarboxylic acid or esters thereof. Such copolyesters may be formed into a variety of products, especially binder fibers for nonwoven fabrics, textile and industrial yarns, and composites. Bonding of a non woven web is obtained by passing the web through an air circulating oven at 302° F. (150° C.) for a two minute dwell time. The batt formed is not a bonded readily handled insulation. The'868 patent does not teach a thermal insulation product bonded with bi-component fiber.

U.S. Pat. No. 6,155,020 to Deem discloses shredded carpet insulation. This method of recycling used carpet comprises sorting waste carpet, shredding the carpet; and forming the carpet into batts and applying the batt insulation into voids and attics of a building. The shredded carpet may also be blown to form insulation. The batt formed is not a bonded readily handled insulation. Using this process, typical clean, waste carpet of nylon, nylon b 6, nylon 6.6, polyester, or polypropylene. is broken down by weight into the following components: 50% face material, 12% polypropylene backing, about 8% SBR latex adhesive, and 30% calcium carbonate filler material. The '020 patent does not teach a thermal insulation product bonded with bi-component fiber.

U.S. Pat. No. 6,670,291 to Tompkins et al. discloses laminate sheet material for fire barrier applications. This laminate sheet material has a first layer comprised of polymeric material and a second layer comprised of non-metallic fibers. The first and second layers at least collectively contribute to the laminate having at least one of a passing Flammability Value, Flame Propagation Value or Burn-through Value. The laminate sheet material is useful, for example, in vehicles (e.g., aircraft), insulation blankets, insulation systems, and systems for limiting exposure of flammable insulation to an ignition source. The laminated sheet material is indicated to be thermally and acoustically insulating. The '291 patent does not teach a thermal insulation product bonded with bi-component fiber.

U.S. Pat. No. 8,113,448 to Keating discloses methods of recycling carpet components and carpet components formed therefrom. Usable compositions containing recycled carpet components, and carpets and carpet components containing recycled carpet components are also disclosed. The method of recycling carpet components includes a primary backing which has a face and a back surface, a plurality of fibers attached to the primary backing and extending from the face of the primary backing and exposed at the back surface of the primary backing, an adhesive composition backing, and an optional secondary backing adjacent to the adhesive backing. The method of making carpet includes extrusion coating the adhesive composition onto the back surface of a primary backing to form the adhesive composition backing. The method of recycling polyolefin carpet can recover one or more polymeric carpet components. There is no disclosure in the '448 patent of using the recycled carpet fibers to form a rigid thermally insulting batt.

U.S. Pat. No. 8,424,262 to Deblander et al. discloses polymeric fiber insulation batts for residential and commercial construction applications. Fiber insulation batts suitable for building thermal insulating applications are made using polymer fibers. A mixture of staple fibers and binder fibers is used to make the batt. The staple fibers are of one or more thermoplastic organic polymers that have a softening temperature that is at least 5° C., preferably at least 10° C., higher than the softening temperature of the lower-melting section of the binder fiber. A preferred organic polymer is a polyester, particularly a polyester corresponding to the reaction product of an aromatic diacid, an aromatic diacid ester, or an aromatic acid anhydride with an aliphatic diol or polylactic acid. An especially preferred polyester is polyethylene terephthalate. The binder fiber similarly is composed of one or more thermoplastic organic polymers, provided that at least a portion of the binder fibers is composed of a lower-softening material as described before. A wide range of combinations of higher- and lower-softening materials can be used to make the binder fiber. For example, a polyester can be used as the higher-softening component of the fiber, and the lower-softening component may be a lower-softening polyester, a polyolefin, or a polyamide. The lower-softening material is preferably a polyester corresponding to the reaction product of an aromatic or aliphatic diacid, and aromatic or aliphatic diacid ester or an aromatic or aliphatic acid anhydride with an aliphatic diol, or polylactic acid. Amorphous or semicrystalline polyesters can be used as the components of the binder fiber. For example, the low melting-point polyester may be a copolymerized ester containing any of aliphatic dicarboxylic acids, such as adipic acid and sebacic acid, aromatic dicarboxylic acids, such as phthalic acid, isophthalic acid, naphthalene dicarboxylic acid, and/or alicyclic dicarboxylic acids, such as hexahydroterephthalic acid and hexahydroisophthalic acid, and any of aliphatic groups and alicyclic diols, such as diethylene glycol, polyethylene glycol, propylene glycol, and p-xylene glycol with any of oxyacids, such as p-hydroxybenzoic acid, added according to the requirement. For example, the low-melting point polyester may be prepared by copolymerizing terephthalic acid and ethylene glycol with isophthalic acid and 1,6-hexanediol added. Since the binder fiber only softens at the bonding temperature the batt has to be compressed to form a bond as indicated at "The polymer batt is conveniently made by forming an entangled mixture of the constituent fibers to form a web, compressing ('calibrating') the web to the desired density, and then heat-setting the web to form the polymer batt". The batt is not indicated to contain fire resistant cotton shoddy.

Based on the foregoing, there exists a need for a thermal insulation batt made from recycled carpets for use in buildings and automobiles having controlled thermal attenuation properties.

SUMMARY OF THE INVENTION

The present invention of thermally insulating batt made from carpet fibers harvested from used carpets. The carpet fibers are harvested by mechanical shearing means or by hammering sliced carpet pieces. The carpet fibers are mechanically de-dusted and then mixed with fire resistant cotton shoddy and staples of bi-component polyester core fibers with a sheath of low melting modified copolyester having melting point 320° F., low molecular weight polyvinylchloride having melting point 248-356° F. depending on molecular weight, polypropylene with melting point 266° F., polyolefin melting point 320° F. or Poly(ethylene/vinyl acetate (Poly(EVA) and Poly(EVOH) having melting point 267° F. All the fibers are mixed thoroughly and air-laid to form a loose packing of fibers. The fiber package is heated to 350-375° F. to create a bond between the sheath of the bi-component staple fiber and adjacent fiber, creating a bonded fiber batt package with insulating properties. The fiber batt package is shaped to needed sizes and is manufactured in lengths up to 8 feet, widths up to 24 inches and thickness up to 4.5 inches. Due to its bond rigidity the bonded insulation batt package can be cut after manufacture to desired widths and lengths. The bonded insulation bay package has thermal resistance a' value of 1.4 per inch of package, The "R-value" of insulation indicates the time in hours required for one BTU to be transmitted through a one square foot area of the insulation when there is a difference of one degree Fahrenheit between the two opposing outer surfaces of the insulation. Since cotton fiber shoddy has fire retardant chemicals, the insulation batt does burn but earned Class A fire raring under ASTM E84 and is usable in interior walls of a building for thermal and acoustic insulation. The fire retardant chemical used is ammonium sulfate, which decomposes at 482° F. or 250° C. producing decomposition into ammonia, nitrogen, sulfur dioxide, and water. The flame propagation is deprived of oxygen and is therefore prevented. The rigid thermal insulation batt meets class A requirements of ASTM E84. Which is Class A: Flame Spread 0-25; smoke-developed 0-450.

Briefly stated, the invention provides a bonded insulation batt which may be used in buildings as wall insulation produced from recycled carpets, the bonding agent being staples of bi-component polyester core fibers with a low melting sheath. The sheath of the bonding bi-component staple fiber melts during heating of fiber assembly creating local bonding between adjacent fibers producing a rigid fibrous insulation batt. The melted sheath does not drip low melting polymer and therefore does not create a poor insulation brick, but maintains the loose packing structure of fibers, creating insulation. The rigid fibrous insulation batt can be cut to various sizes according to user needs.

The key feature of the invention is carpet fibers are varied in material composition including cotton, wool, nylon, polyester, polypropylene and others and comes in various pile heights. Preferred method of harvesting spent carpet fibers is mechanical shearing at the carpet foundation level. While other methods including hammer milling of sliced carper pieces may be used. These fibers have varying flame retardant capability. The bonding agent selected has to bond with all of these fibers to create a bonded fiber insulation batt. Each of these recycled carpet fibers has different melting points. Cotton and wool fibers can tolerate 450° F. without charring. Nylon 6 fibers melt at 428° F., nylon 66 fibers melt at 509° F. Polyester melts at 500° F. The bonding temperature is chosen to be between 350° F. to 375° F., using bi-component polyester core fibers coated with a sheath of low melting point polymer capable of melting at this bonding heat treatment temperature. The sheath coating may include low melting polymers selected from low melting modified copolyester with melting point 320° F., low molecular weight polyethylene with melting point 248-356° F. depending on molecular weight, polypropylene with melting point 266° F., polyolefin melting point 320° F. or poly(ethylene/vinyl acetate (Poly(EVA) and Poly(EVOH) with melting point 267° F.

In a first broad embodiment there is provided a novel insulation product produced from spent carpet and/or fiber waste, comprising: a) post-consumer recycled carpet ranging from about 40-50 wt. % (most preferably, about 42.5%); b) fire retardant cotton shoddy ranging from about 40-50 wt. % (most preferably, about 42.5%); and c) resin binder in the form of bi-component polyester core fibers with a low melting sheath ranging from about 5-20 wt. % (most preferably, about 15%). The subject formulation achieves a Class A fire rating. In processing, once post-consumer/spent carpet enters the process, it is sorted by face fiber and backing type, including Nylon 66, Nylon 6 and polypropylene. Next, the sorted carpet waste is processed through a shearing system to achieve 99-percent nylon purity post-consumer recycled carpet. In forming the final subject 'Insulation Product preferably about 42.5% of the post-consumer recycled carpet is mixed with about 42.5% fire retardant shoddy and 15% resin binder to form the final insulation batt product. The fire retardant shoddy may use recycled clothing waste.

Significant advantages are realized by practice of the present invention. In a preferred embodiment, the method of the present invention comprises:

a) carpet fibers from a spent carpet harvested by mechanical shearing or mechanical separation processing of chopped pieces of carpet;
b) cleaning harvested carpet fibers of cotton, wool, nylon, polyester or other fibers;
c) procuring fire resistant cotton shoddy soaked in ammonium sulfate saturated solution and dried;
d) procuring staples of bi-component fibers with polyester core and low melting sheath polymer melting at a temperature below 350° F.;
e) said low melting sheath polymer selected from modified copolyester, low molecular weight polyethylene, polypropylene, polyolefin and poly(ethylene/vinyl acetate;
f) uniformly mixing carpet fibers, fire resistant cotton shoddy and staples of bi-component fibers;
g) air layering the uniform mixture in a mold of the required size of insulating batt without applying compressive force; and
h) heating the mold in the temperature range of 350 to 375° F. creating a bond between fibers that contact the bi-component fibers creating a batt that does not become soaked by melt flow, thereby maintaining insulation capability of the rigid batt;

whereby the insulting batt is cut to a required size for insulation in buildings between studs as well as in automobile doors, providing sound proofing.

BRIEF DESCRIPTION OF THE DRAWING

The invention will be more fully understood and further advantages will become apparent when reference is had to the following detailed description of the preferred embodiments of the invention and the accompanying drawing, in which.

DETAILED DESCRIPTION OF THE INVENTION

This invention relates to forming a rigid bonded insulation batt made from carpet fiber of spent carpets. This invention has enormous impact on the environment since several million tons of spent carpets are discarded in landfills and these carpets do not readily degrade. Due to its low bulk density, carpet waste can be voluminous. Therefore, recycling of these carpets and rugs would have a significant impact on efforts to effectively reduce plastic components in municipal waste streams. Carpet scraps of the sort noted above, can prove to be a valuable resource if the plastic generated from recycling can be used for other useful applications rather than being discarded into municipal waste streams.

The present invention takes advantage of any carpet fiber to effectively bond forming a loosely bonded low density batt, which is thermally insulating due to trapping air pockets. The bonding process of the fibers should not result in excessive melt flow since this closes off air pockets, increasing thermal conduction and loss of insulation capability. The bonding between carpet fibers, fire resistant cotton shoddy and polyester bi-component staple fibers is accomplished by having a low melting polymeric sheath overcoat provided on the bi-component polyester fiber. Since the thickness of the low melting polymer provided on the polyester is carefully controlled by an extrusion process, the amount of melt available for bond creation is very carefully controlled and no melt overflow occurs compromising insulation properties of the insulation batt produced.

Figure 1:
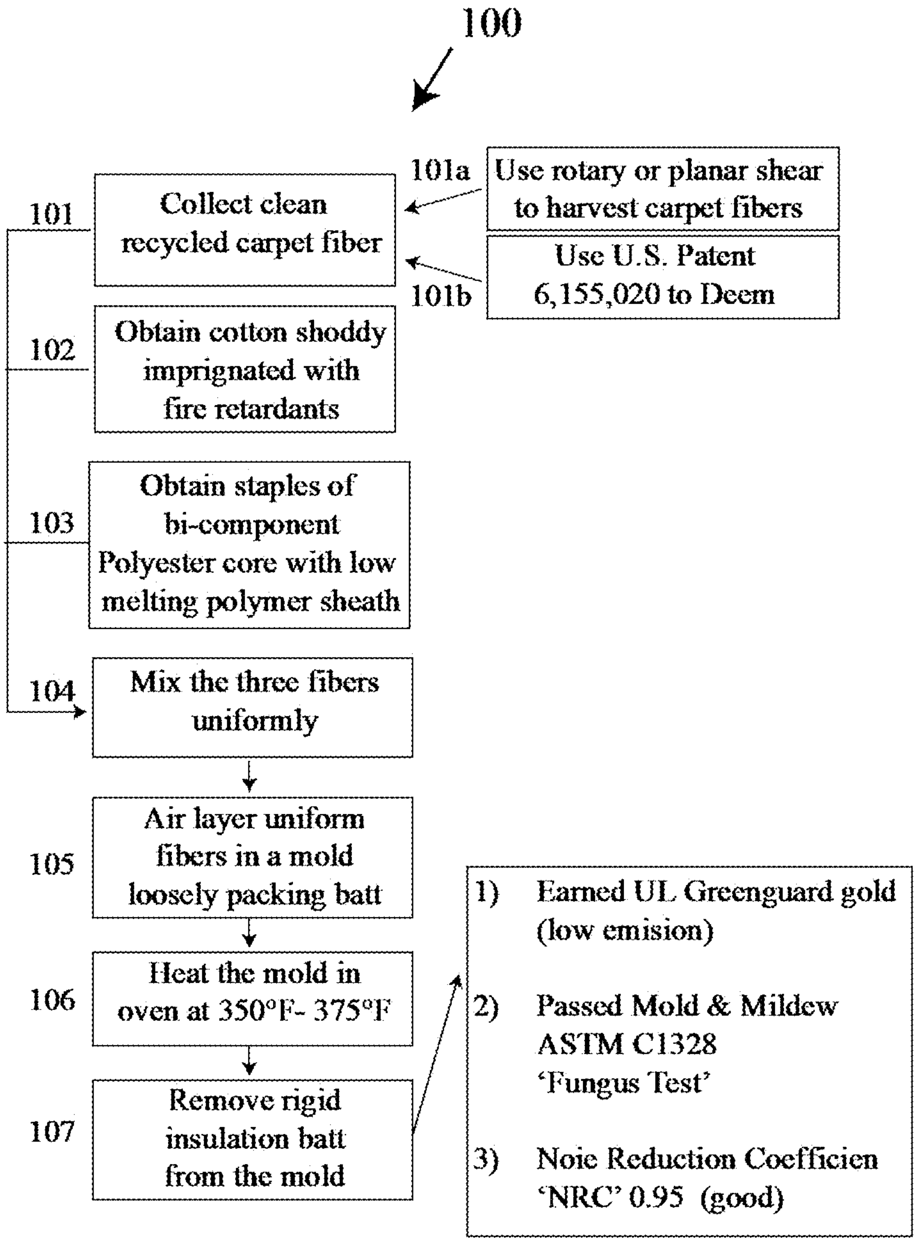
FIG. 1 illustrates at 10 a schematic diagram of the steps in forming the insulating batt.

FIG. 1 illustrates at 100 the schematic diagram of the steps in forming the insulating batt. At step 101, clean recycled carpet fibers are collected. This process uses a rotary or planar shear to cut the carpet pile very near the carpet base as shown at 101*a*. The carpet fibers collected may be cotton fibers, wool fibers, nylon fibers, polyesters fibers, and the like. The fibers may be collected using a complex separation process, as detailed in U.S. Pat. No. 6,155,020. At step 102, cotton shoddy is soaked in saturated ammonium sulfate or other fire retardants and dried. At step 103, staples of bi-component fibers with polyester core are coated with a sheath of low melting polymers. The low melting polymer melts at a temperature lower than 360° F. Candidate low melting polymers for the sheath coating are modified copolyester, low molecular weight polyethylene, polypropylene, polyolefin and poly(ethylene/vinyl acetate. Modified copolyester coated staple polyester fiber is available from https://www.huvis.com/eng/product_info.asp?num=0_1&f=21&s=4&t=50&p=110 under the trade name LM. Polyethylene or polypropylene coated staple fiber is available from https://www.huvis.com/eng/product_info.asp?num=0_1&f=21&s=4&t=50&p=110.

Figure 2:
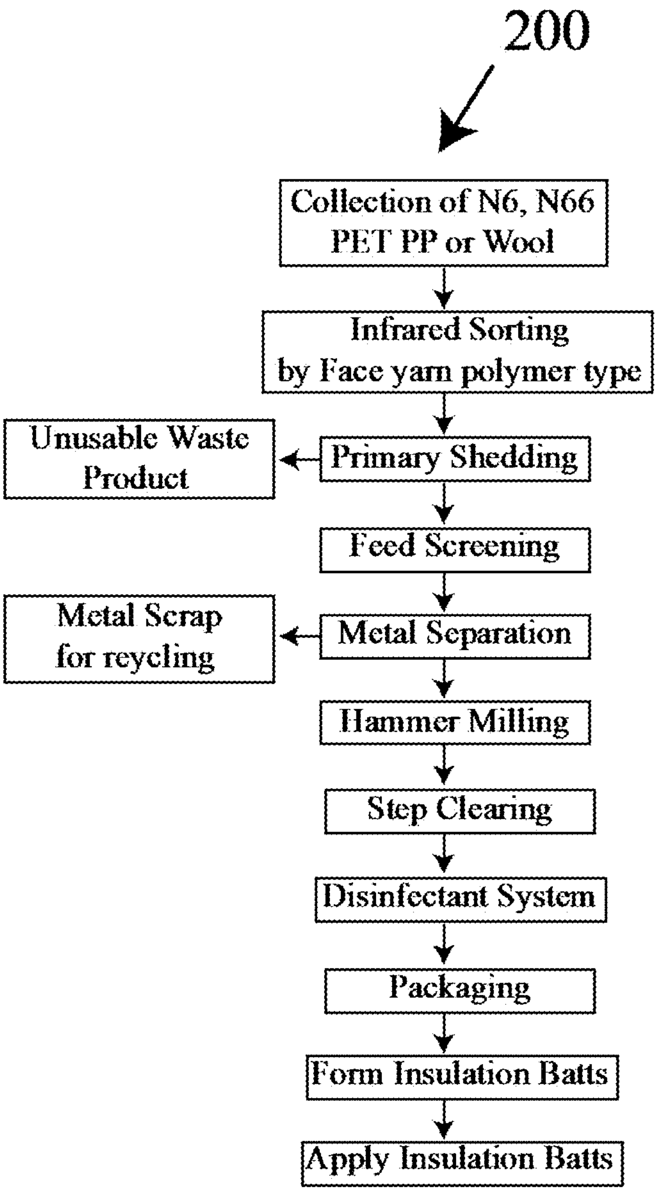
FIG. 2 illustrates at 20 a conventional method for separating carpet fibers from recycled carpets.

FIG. 2 illustrates at 200 the conventional method for separating carpet fibers from recycled carpets. The process set forth in U.S. Pat. No. 6,155,020 to Deem (the '020 patent) may be utilized when preparing sorted carpet waste for the 'Insulation Product. The '020 patent provides an economical and efficient insulation material formed from recycled carpet waste. The basic processing steps include: 1) the post consumer (i.e. waste) carpet in bailed or rolled form is first visually inspected and separated from heavily contaminated waste so as to provide good quality material for processing; 2) the material is then fed into the primary shredder so as to form strips of the waste carpet; 3) the waste carpet strips are then fed onto a feed screen for the separation process by shifting some of the styrene butadiene rubber latex adhesive, calcium carbonate filler, and polypropylene backing from the polymeric face fibers; 4) the backing material separated from the screen feeder is transferred to the filter/receiver and the carpet strips are then fed into a metal separator to remove any metals such as carpet staples, tacks, bailing wire, etc. 5) the carpet strips are then fed into the primary hammer mill to begin the reduction and dismantling of the carpet strips into a heterogeneous mixture of the carpet face fiber and backing. A step screener then separates the top screen into over-sized pieces and returns them back to the hammer mill for a second pass, while the middle screen collects the face tufts that are generally ¼ inch to 1 inch in length and have had the bulk of backing material removed; 6) this feed is then transferred where the material can be treated with disinfectant and/or fire retardant additives; 7) the treated face material, typically having an average bulk density of 3-4 lbs./$ft^3$, is transferred to a tumble drying station where the material drying process is accelerated and the disinfectant and/or fire retardant additives may set into the carpet face material; 8) the carpet face material is then transferred to a final feed screen to remove any loose backing material that may remain or have been separated during the tumble drying operation; 9) this material is transferred to the filter/receiver; 10) the material is then fed to a packing machine for consumer insulation use or bailed for other industrial uses.

Figure 3:
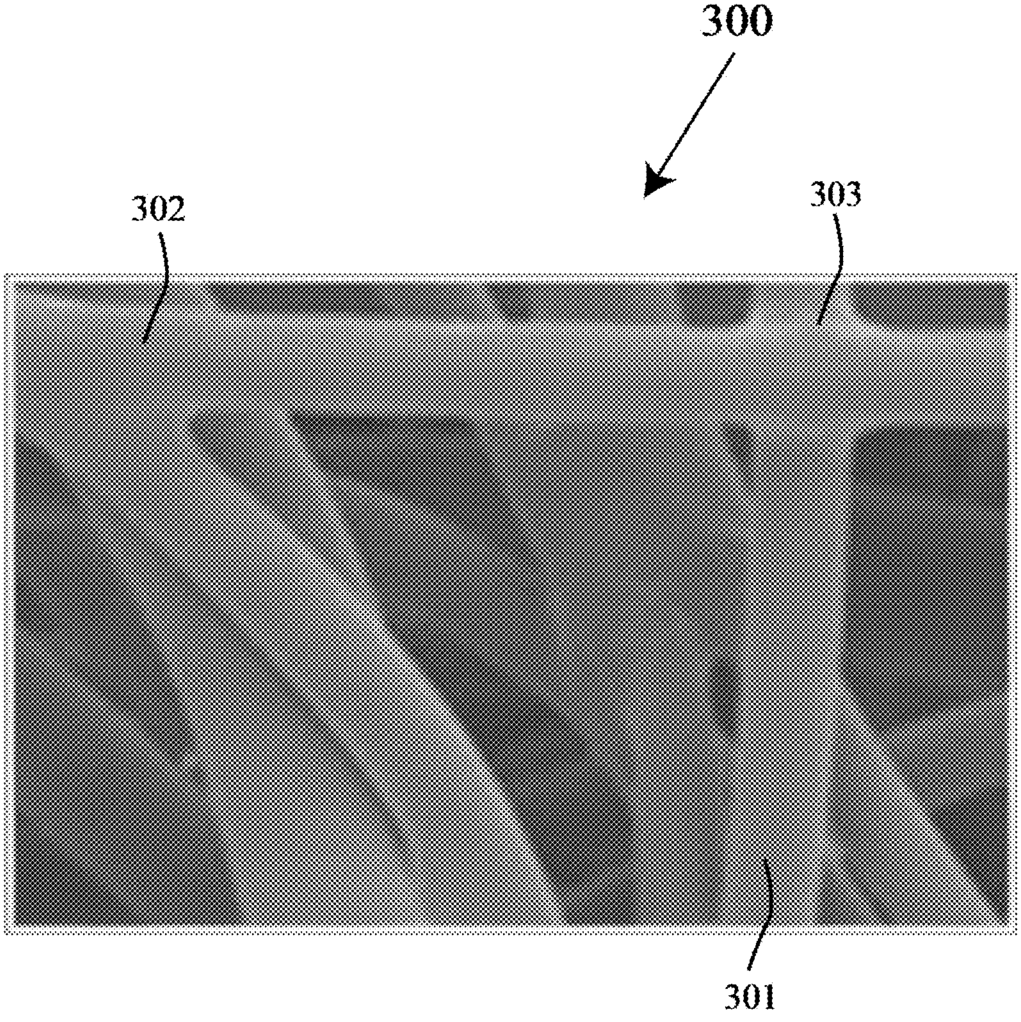
FIG. 3 is a photograph of bond between a bi-component fiber and a recycled carpet fiber.

FIG. 3 illustrates at 300 a photograph of the bond between a bi-component fiber and a recycled carpet fiber. The bi-component fiber is shown at 301. The recycled carpet fiber is shown at 302. The bond formed by the melting of the sheath of the bi-component fiber after heating is shown at 303. Note that the molten sheath polymer only forms the bond without spilling everywhere.

Having thus described the invention in rather full detail, it will be understood that such detail need not be strictly adhered to, but that additional changes and modifications may suggest themselves to one skilled in the art, all falling within the scope of the invention as defined by the subjoined claims.

The invention claimed is:

1. A method for manufacturing a thermal insulation batt from spent carpet fibers, comprising the steps of:

a) harvesting carpet fibers from spent carpet by mechanical shearing or separation processing of chopped pieces of spent carpet to produce harvested recycled carpet fibers of cotton, wool, nylon, polyester;

b) cleaning the harvested, recycled carpet fibers of cotton, wool, nylon, polyester;

c) procuring fire resistant cotton shoddy soaked in ammonium sulfate saturated solution and dried;

d) procuring staples of bi-component fibers with polyester core and low melting sheath polymer melting at a temperature below 350° F.;

e) uniformly mixing the harvested recycled carpet fibers, fire resistant cotton shoddy, and staples of a resin binder composed of bi-component fibers to make a uniform mixture;

f) air layering the uniform mixture in a mold to form the insulating batt without applying compressive force; and g) heating the mold in the temperature range of 350 to 375° F., creating a bond between harvested, recycled fibers of the uniform mixture that contact the bi-component fibers, creating a rigid insulating batt that does not become soaked by melt flow, maintaining insulation capability of the rigid insulating batt;

whereby the rigid insulting batt is cut to a required size for insulation in buildings between studs and in automobile doors, providing sound proofing.

2. The method of manufacturing thermal insulation batt from spent carpet fibers as recited by claim 1, wherein said low melting sheath polymer selected from modified copolyester, low molecular weight polyethylene, polypropylene, polyolefin, and poly (ethylene/vinyl acetate).

3. The method of manufacturing thermal insulation batt from spent carpet fibers as recited by claim 1, wherein said thermal insulation batt comprises recycled carpet fibers ranging from about 40-50 wt. %, said fire resistant cotton shoddy ranging from about 40-50 wt. %, and said resin binder in the form of bi-component polyester core fibers with a low melting polymeric sheath ranging from about 5-20 wt. %.

4. The method of manufacturing thermal insulation batt from spent carpet fibers as recited by claim 2, wherein said thermal insulation batt comprises recycled carpet fibers of about 42.5 wt. %, said fire resistant cotton shoddy of about 42.5 wt. %, and said resin binder in the form of bi-component polyester core fibers with a low melting polymeric sheath of about 15 wt. %.

5. The method of manufacturing thermal insulation batt from spent carpet fibers as recited by claim 2, wherein said thermal insulation batt has a length up to 8 feet, width up to 24 inches and thickness up to 4.5 inches, a thermal resistance 'R' value of 1.4 per inch thereof, and a Class A fire rating under ASTM E84.

6. The method of manufacturing thermal insulation batt from spent carpet fibers as recited by claim 2, wherein said thermal insulation batt is used as insulation in between building studs.

7. The method of manufacturing thermal insulation batt from spent carpet fibers as recited by claim 2, wherein said thermal insulation batt is used as insulation in automobile doors for acoustic sound proofing.

* * * * *